United States Patent [19]

Ervin et al.

[11] Patent Number: 5,013,167

[45] Date of Patent: May 7, 1991

[54] BOUNDED WORD REPLACE FUNCTION FOR AN ELECTRONIC TYPEWRITER ERASING A ZONE BOUNDED BY ERRONEOUS CHARACTERS

[75] Inventors: Julie M. Ervin, Versailles, Ky.; Mark M. Ingerman, Boston, Mass.; Ronald E. Jones, Lexington, Ky.

[73] Assignee: International Business Machines Corporation, Armonk, N.Y.

[21] Appl. No.: 153,905

[22] Filed: Feb. 9, 1988

[51] Int. Cl.$^5$ ............................ B41J 5/30; B41J 29/26
[52] U.S. Cl. ........................................ 400/63; 400/695
[58] Field of Search .................. 400/63, 74, 645, 696, 400/697, 697.1

[56] References Cited

U.S. PATENT DOCUMENTS

| 4,136,395 | 1/1979 | Kolpek | 400/74 |
| 4,655,620 | 4/1987 | Adams | 400/83 |
| 4,730,269 | 3/1988 | Kucera | 400/63 |
| 4,780,008 | 10/1988 | Ueno | 400/63 |
| 4,818,131 | 4/1989 | Sakai | 400/63 |

FOREIGN PATENT DOCUMENTS 042086 6/1985 Japan ............................... 400/697

OTHER PUBLICATIONS

I.B.M. Technical Disclosure Bulletin, vol. 23, No. 3, Aug. 1980, pp. 1107-1108.

Primary Examiner—David A. Wiecking
Assistant Examiner—Steven S. Kelley
Attorney, Agent, or Firm—Laurence R. Letson

[57] ABSTRACT

The typewriter is equipped with the capability to check or verify the spelling of words as they are typed and the typewriter may also upon request from the operator provide candidate words from which the operator may select a word to replace a misspelled word. When a candidate word is selected, the typewriter electronic controls check the spelling of the misspelled word and delimit the zone which contains the erroneous characters. Only the characters that are within this bounded zone are erased from the page and the character which fit within the zone in the new or correctly spelled word are printed, eliminating the need to remove characters which are outside the zone and which are correct in the original word and will be correct in their position in the correctly spelled word.

6 Claims, 5 Drawing Sheets

BOUNDED WORD REPLACE FUNCTION FOR AN ELECTRONIC TYPEWRITER ERASING A ZONE BOUNDED BY ERRONEOUS CHARACTERS

FIELD OF INVENTION

This invention relates to electronic typewriter functions and specifically to the function of spelling assistance by correcting a misspelled word through replacement of the incorrect characters.

BACKGROUND OF THE INVENTION

With the advent of spelling checker functions on typewriters, starting in 1984, the typewriter had a dictionary of words of a finite size built into the electronic controls. The presence of this dictionary allowed the typewriter to provide the operator with spelling verification. When a word was misspelled as determined by the spelling checker function, the operator could correct it based upon personal knowledge, by the correct spelling of the word being keyed to replace the incorrectly spelled word. This approach is described in U.S. Pat. No. 4,136,395 to Kolpek et al.

With the candidate words being contained in the dictionary, an algorithm was developed to select the most likely candidates, based upon such parameters as beginning letter, word length and others. With the candidate words selected and displayed to the operator, it only remained for the operator to select the desired one of the candidate words for substitution for the incorrectly spelled word.

When the correctly spelled word is provided to the processor, the processor automatically controls the printing mechanism of the typewriter to cause the erasure of the incorrectly spelled word and the printing of the correctly spelled replacement word. This results in the unnecessary removal and retyping of letters that are correct in the word and in the proper position. The resulting sequence of operations involve a waste of time, printing ribbon and correction ribbon, all resulting in the waste of money and inefficiencies.

A significant reason for the inclusion of the spelling assistance feature on a typewriter is to increase the quality of work, efficiency and productivity of the typist. Once the spelling assistance capability is available on the typewriter, an additional opportunity to further improve the efficiency and productivity of the typewriter is presented.

SUMMARY OF THE INVENTION

The invention overcomes this wastage and inefficiency of the prior word correction techniques by only erasing and replacing those characters that are located in a position within the word, between the left and right limits of the errors. Limits of correction are established by the comparison of the erroneous word and the candidate word selected by the typist to enclose or bound the erroneous letters. All letters between the limits are erased and replaced with the correct letters for those positions.

The removal of only those characters between the left and right erase limits or boundaries and the replacing of those characters greatly economizes on the usage of the correction tape and printing ribbon.

A more detailed description of the invention and its best mode of implementation follows with references to the drawings.

DETAILED DESCRIPTION OF THE INVENTION

Figure 1:
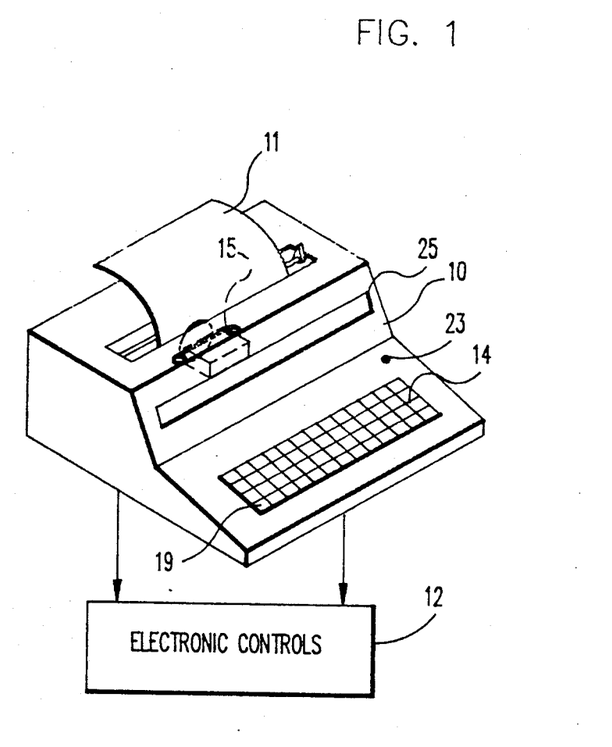
FIG. 1 is an illustrative diagram of the electronic typewriter.
Figure 2:
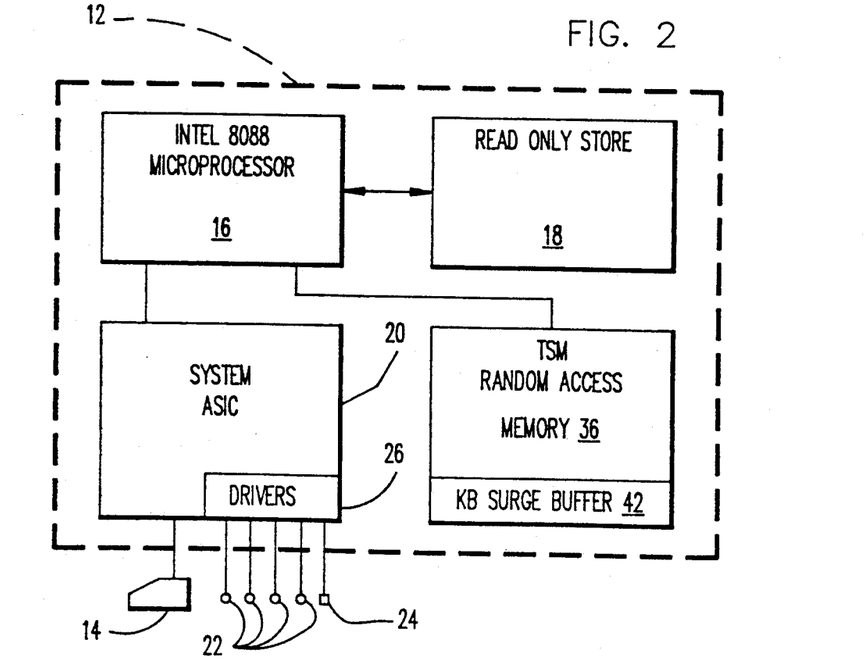
FIG. 2 is a block diagram of the electronic controls of the typewriter.
Figure 3:
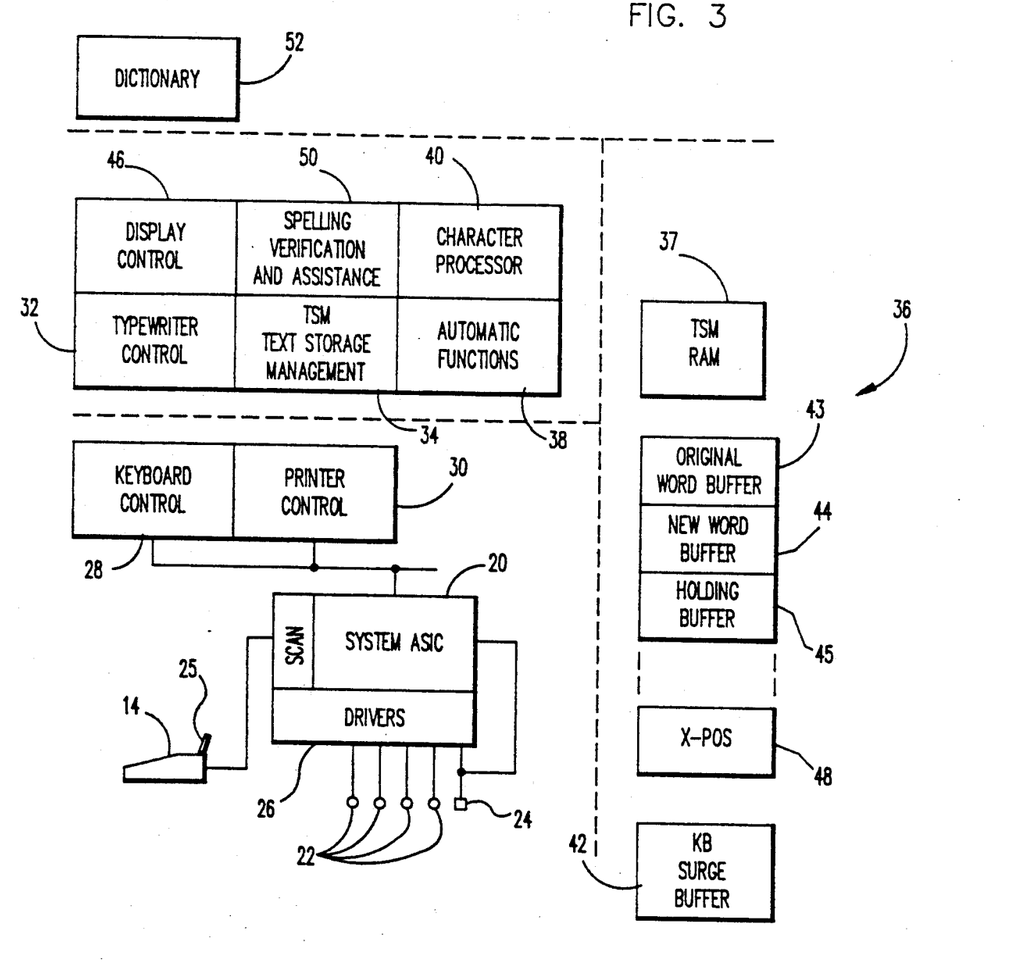
FIG. 3 is a block diagram of the functional relation of the microprocessor and its software with the keyboard, motors, magnet, and memories of the typewriter.

Referring to FIG. 1, the electronic typewriter 10 is illustrated with the electronic controls 12 shown symbolically as a block exterior to the typewriter 10. The electronic controls 12 receive electronic signals from the keyboard 14 and send electronic control signals to the typewriter 10 to cause the typewriter to perform the functions that have been designated at the keyboard 14, such as print a character, carriage return, tabulate, correct a character or line feed. For a better understanding of the electronic controls 12, refer to FIG. 2. In FIG. 2, electronic controls 12 are displayed as four elements, a microprocessor 16, a Read Only Storage 18, a Random Access Memory 36 and a system ASIC or Application Specific Integrated Circuit 20, and memory 36. As illustrated in FIG. 3, memory 36 further comprises a bank of word buffers 43, 44 and 45 and an X Position register 48.

The microprocessor 16 may be any of a number of commercially available microprocessors. The preferred microprocessor, chosen for this description, is the Intel 8088, sold by the Intel Corporation, Santa Clara, Calif. One skilled in the art will recognize that this is a general purpose microprocessor for which other processors may be substituted. The microprocessor 16 is controlled by supplying to it software instructions in the form specified by the manufacturer. These instructions constitute a control program which is stored in a suitable memory such as the Read Only Store 18. The Read Only Storage memory 18 is loaded with the instructions at the time of manufacture and contains the set of instructions necessary for the microprocessor 16 to make the typewriter 10 function as desired.

The system ASIC 20 is a standard set of AND, OR and other logic elements which may be customized as the user desires, specifically in this device to scan the keyboard 14 and control the signals from the keyboard 14. The ASIC 20 also controls the interrupts to the microprocessor 16 and captures the keyboard signals until they are used by the microprocessor 16. Also the ASIC 20 controls the signals from the microprocessor 16 and directs the processor output signals to a set of driver circuits 26 which convert the processor signals into signals that can be used to drive motors 22 and magnet 24.

The specific combination of the discrete logic elements in the ASIC 20 is designed to provide a number of functions and signals. Some of the signals and functions provided are the keyboard scan to detect any newly depressed keys, interrupts of the processor 16 to cause the processor to accept a signal and the timing of signals sent to the drivers 26 so that the motors 22 and magnet 24 of the typewriter operate in the proper time frame and sequence.

The keyboard scan function, timer operation, interrupt operation and other functions of the ASIC 20 are all found essentially in commercially available keyboards with discrete components which perform the same operation. The ASIC 20 serves to consolidate all such operations on a single chip and thus economize in space as well as cost. ASIC 20 and its functions, as just mentioned, form no essential part of the novel contributions of this invention.

To further expand the description of this feature, FIG. 3 illustrates an expanded functional representation of the microprocessor 16 and its associated software stored in Read Only Storage memory 18. The software may be prepared by any programmer of ordinary skill in the art and may take any number of forms, any of which will adequately perform the functions of controlling the typewriter 10.

The ASIC 20 is connected to the processor 16 and is responsive to the keyboard control software 28. The ASIC 20 scans the keyboard 14 and interrupts the microprocessor 16 when the ASIC 20 recognizes a key state change. The keyboard control 28 causes the storage of the keystrokes from the keyboard in the keyboard surge buffer 42 until the typewriter control 32 is ready to work on the keyboard scan data.

The printer control segment 30 generates and sends the signals that are needed to operate the printer, to the ASIC 20 so that the ASIC 20 may provide signals properly sequenced and timer controlled.

The typewriter control 32 serves to accept the keyboard data from the keyboard control 28 whenever the microprocessor 16 is available to process textual data and acts to determine whether the keyboard data is representative of the alphanumeric symbols that are to be printed or representative of the functions that may be keyboard controlled. The typewriter control 32 utilizes the capabilities of the Keyboard Control 28 to retrieve the stored scan codes from the keyboard surge buffer 42.

To manipulate the text in Random Access Memory 36 and retrieve the text, the Text Storage Management segment 34 (TSM) controls the storage of text and the necessary other codes that facilitate the efficient operation of the Random Access Memory 36. The Text Storage Memory 37 of Random Access Memory 36 is the repository of the stored codes containing the text. A line header contains data defining the X and Y positions of the first character on the line, as well as other information not necessary for this invention. When Character Processor 40 indicates a need for a new line header for text, the TSM 34 utilizes the contents of the status registers 48, which contain the location of the print mechanism, relative to the record sheet 11, to build the line header and store it in the memory 36. In order to perform functions automatically in response to keyboard commands, the Automatic Functions segment 38 is responsible for the controlling of those functions which are performed by the typewriter 10, and which are not character processing operations. The output signals of the Automatic Functions segment 38 pass to the printer control segment 30 where the signals are processed to generate the precise control signals necessary to control the motors 22 and magnets 24 of the typewriter 10.

To identify, select and print characters and escape the print mechanism 15, along a line to be printed, the Character Processor segment 40 has the dedicated purpose of receiving those codes from the typewriter control segment 32 that represent the characters or other symbols that are to be printed on the record sheet 11. The Character Processor segment 40 receives a decoded scan output of the keyboard 14 and determines if it is printable in the desired location. The Character Processor segment 40 is also responsible for storing the character codes in a correction buffer which is part of the TSM Random Access Memory 36.

The Character Processor 40 passes the printable character code to the Printer Control segment 30 which then, based on the data received, determines the specific motors 22, numbers of pulses, direction, and current levels to the motors 22 and magnet 24 that are required to properly print the symbol on the record sheet 11, as is conventional.

The Character Processor also passes the printable character output code to the display control 46, where the code is further processed and the necessary signals sent to the display 25. The display 25 allows, among other things, the displaying to the operator of a list of words that may be candidates for replacing a word that is misspelled and where the operator has requested the spelling verification and assistance function in segment 50, provides a list of words that are possible replacement candidates for a misspelled word. The spelling verification function has been available on typewriters since 1984, and is described in U.S. Pat. No. 4,689,768, to R. S. Heard et al and is incorporated herein by reference. The function of spelling assistance is presently marketed in the form of a program titled "Word Proof", copyrighted 1983 by International Business Machines Corporation, for use on the IBM PC and other IBM personal computers which replaces the misspelled word on the computer display screen, but does not effect corrections on the paper, since the computer only prints out after all processing of the text is complete. The same algorithm may be used in the microprocessor 16. The operation of the function is described and disclosed in U.S. Pat. Nos. 4,328,561 and 4,355,371 both issued to Convis et al and commonly assigned with this application, and incorporated herein by reference.

The spelling verification and assistance segment 50 will verify the spelling of the words keyed by the operator as the operator manipulates the keyboard 14. If the word is misspelled and the typist activates the spelling assistance function, the microprocessor will cause the spelling assistance algorithm to search the contents of the dictionary memory 52 and to select the most likely candidates to replace the misspelled word. These candidates are presented to the operator on the display 25. Thereafter the operator may select one of the candidate words by using the keyboard 14 to position a cursor or other similar indicator on the display 25 in proximity to the selected word and then operating keyboard 14 in a designated manner to invoke the replacement of the misspelled word on the record sheet 11 with the desired word.

The detailed workings of the typewriter 10 and the microprocessor 16 in the effecting of the erasure of the incorrect word and the replacement with the newly selected word will be explained below with reference to FIGS. 4, 5 and 6.

A keyboard surge buffer 42 is a storage device provided so that in the event that keyboard scan data is received by the system ASIC 20 at a higher rate than the system can or does utilize the information, the key stroke scan data will not be lost to the keyboard control 28.

The illustration of the different segments of the operations are schematically illustrated as dedicated functional blocks of the processor 16 with the software instructions stored in the Read Only Storage 18 interacting with the processor 16 to perform the necessary data processing and produce the output signals required to control the typewriter 10 to either perform a function or to print a symbol at the desired location on the record sheet 11. Thus, FIG. 3 is a functional diagram expressed in both hardware and a combination of hardware and software.

Figure 4:
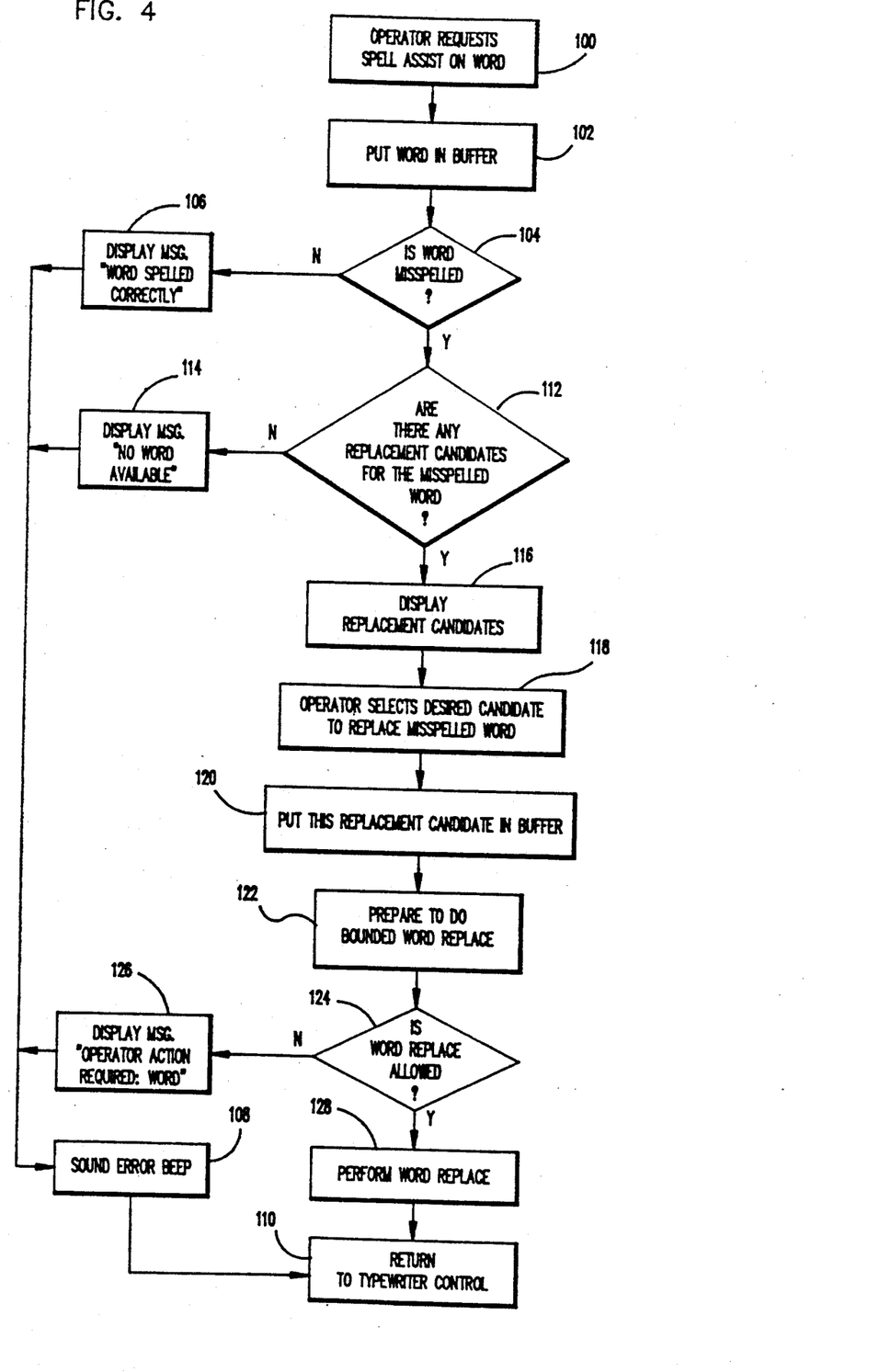
FIG. 4 is a flow diagram of the operations performed by the electronic controls of the typewriter along with the operator input commands, which cause the operation of the invention.

Referring to FIG. 4, the operator requests spelling assistance by invoking the function thru the depression of predesignated keys on the keyboard, in operation 100. Often this occurs immediately after the operator has typed a word and has been alerted to possible misspelling by a beep or other signal as part of the spelling verification function. When spelling assistance is invoked, the word which has the cursor of the display under it or within one space to the right of it, referred to as the original word, even though it may be incorrectly spelled, is loaded into a buffer designated as the original word buffer 43 in operation 102.

After the original word is loaded in the original word buffer 43 in operation 102, a spelling verification operation is performed to determine if the word is incorrectly spelled, in operation 104. If the word is correctly spelled, then the logic flow branches to operation 106 where a message, such as "Word Spelled Correctly", is displayed on the display.

After the "Word Spelled Correctly" message or similar message is displayed as in operation 106, the control logic commands the sounding of an error beep or tone or other attention getting alarm in operation 108, to alert the operator that something has occurred that will require the attention of the operator.

Thereafter, the logic control flow is directed to operation 110 where the logic control is returned to the typewriter control 32.

Returning to operation 104, where the misspelled or not status of the original word is determined, if the word is misspelled, then the flow goes to operation 112, where it is determined if there are any replacement candidates for the misspelled word. The selection of the candidates for the misspelled word is a known technique which is found on typing and word processing products in the market. One example of a wordprocessing product which selects candidate words to replace the incorrect word is the program product Word Proof, part number 6024071, copyrighted 1983 by International Business Machines Corporation.

The best mode of implementing this invention includes the use of the basic algorithm of "Word Proof" to select the candidate words. This basic algorithm is also disclosed in U.S. Pat. No. 4,328,561, to Convis et al.

Not all misspelled words are such that they will be recognized by the candidate algorithm. If a word is so thoroughly garbled or unusual that the algorithm does not find and identify any suitable candidates, the logic flow branches from operation 112 to operation 114 where the commands are generated to display a message, such as "No Word Available," or similar message. From operation 114 the flow is through operation 108 where the error alarm is activated to insure that the operator is alerted to this condition and thence to operation 110 where control is returned to the typewriter control segment 32.

Reverting back to operation 112, if replacement candidates are determined for the misspelled word, then the flow is to operation 116 where the logic commands the displaying of the candidate words, so that the operator may select the replacement candidate desired.

Following the display of the candidate words selected by the algorithm in operation 116, the operator may select one of the candidate words as the desired correctly spelled word or new word for substitution for the incorrectly spelled word or original word, operation 118. The operator may accomplish this selection through any of a number of ways but the preferred technique is to move the cursor under the selected word and enter a word replace command thru the keyboard 14, as is conventional. The word may be designated in any of a number of other ways such as by keying the word into the keyboard 14, or by predefining a unique designator for the selected word and inputting that designator thru the keyboard 14. The exact method of designation is not critical to the invention.

Once the operator selects the desired word in operation 118, the selected word is loaded into a replacement word buffer or new word buffer 44, in FIG. 3, in operation 120. Thus the selected word is available for use and insertion into the text data stream as a replacement for the original word.

After the selected word is loaded into the replacement word buffer, the logic, in operation 122 prepares to do the bounded word replace. To better understand the operations which make up operation 122, the content of operation 122 has been expanded for explanation purposes and is illustrated in FIG. 5. Description of FIG. 5 appears below.

After the sequence of events constituting operation 22, the logic control flow is to operation 124 where the decision is made as to whether the word replace function is allowed. In some instances, for example where the replacement word is too long to fit the space left by the original word, word replace is not permitted. Other instances where word replace would not be permitted would be: where the original word is partly underscored, where there is insufficient room in memory to carry out the operation, or where only part of the original word has been printed from memory and the remainder is displayed on the display. In instances such as these, the word replace function will not operate and the logic branches to cause the displaying of a message such as "Operator Action Required," in operation 126. Then, as with the operations 106 and 114, the error alarm is activated in operation 108 prior to the control of the microprocessor being returned to the typewriter control segment 32 in operation 110. This error alarm may be a beep or visual such as light 23, of FIG. 1.

If one of the conditions which prevents the word replace function from operating is not found then the control flow is from operation 122 along the affirmative path to operation 128. The detailed operation of operation 128 is illustrated in the flow diagram of FIG. 6, which represents operation 128 in expanded detail.

After the word replace operation is finished in operation 128, the control flow is directed to operation 110 where the control of the typewriter is returned to the typewriter control segment 32 of the microprocessor.

Figure 5:
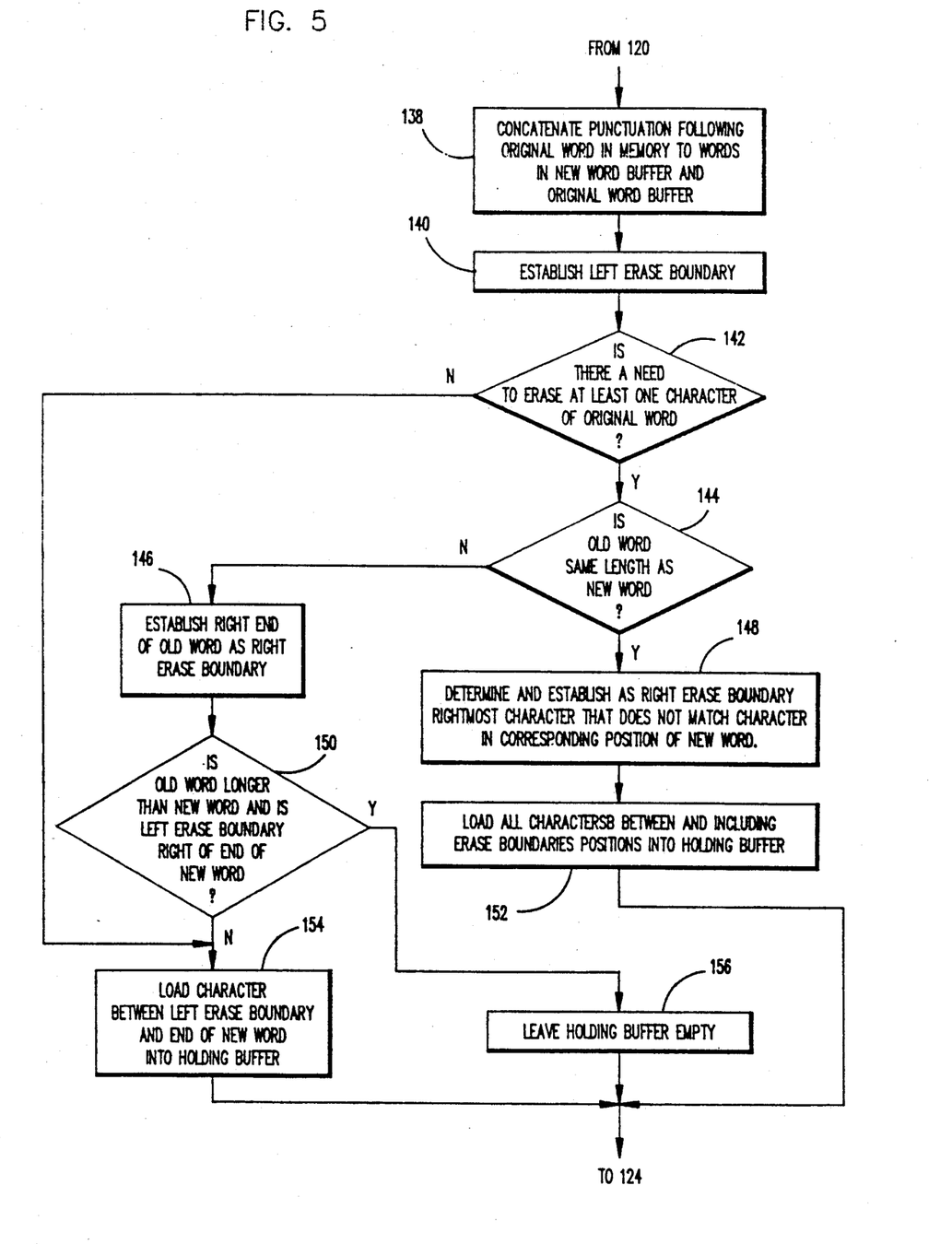
FIGS. 5 and 6 are flow diagrams which expand the illustration of selected operations depicted in FIG. 4.

For a more expansive explanation of operation 122 in FIG. 4, reference is now made to FIG. 5. Entering the flow diagram of FIG. 5 from operation 120, where the selected replacement word (new word) is loaded into the new word buffer 44, the flow is to operation 138 where any concatenated punctuation following the original word is loaded into both the original word buffer 43 and the new word buffer 44. This insures that if the punctuation mark will be erased from the page if necessary to make the correction and that the punctuation mark will be properly positioned at the end of the word after the new word has been printed. After the concatenated punctuation is loaded into the two buffers 43, 44, the flow is to operation 140, where the Left Erase Boundary (LEB) is established. This is accomplished by the comparison of the contents of the original word on a character by character and position by position basis to determine the left most character and position which fails to correspond with the character occupying the corresponding position of the new word. This position within the word is designated the Left Erase Boundary or LEB. Once the LEB is established, the the flow is to operation 142.

In operation 142, a determination is made as to whether there exists a need to erase at least one character. This determination is made because the original word may be correctly spelled up to the point where the spelling assistance algorithm is invoked and the new word is the same as that typed but with an additional letter or more. In such a case there is no need to erase any characters in the original word. Where there are no characters to erase, the logic control flow branches thru the negative path to operation 154 where the characters between the LEB and the right end of the new word are loaded into holding buffer 45, in FIG. 3.

If one or more characters of the original word require erasing, the affirmative path is followed to operation 144 where the two words are compared to determine if they are the same length. If not, then the entire right portion of the word will require erasure and the right end of the original word is established as the Right Erase Boundary (REB), in operation 146.

After the end of the old word is established as the REB in operation 146, a determination is made in operation 150 to ascertain if the old word is longer than the new word and if the LEB is the right end of the new word. This condition is the one where the original word had an incorrect and extra letter or more on the trailing end of the correctly spelled word. If this condition exists, then there are no new character or characters to print to produce the new word and the holding buffer 45 need not be loaded and is therefore left empty in operation 156.

If the original word is not longer than the new word or the LEB is not right of the end of the new word, the characters between the LEB and the right end of the new word need to be ultimately printed in the appropriate positions and they are loaded into the holding buffer.

Referring back, now, to operation 144, if the two words are the same length, the affirmative path from operation 144 to operation 148 is followed. At operation 148, the position of the REB is determined and the REB is established as the position of the rightmost character that does not match the character in the corresponding position of the new word. Thus the REB is placed in a position where there are no incorrect characters for those positions to the right of the REB, and the two boundaries apply to both the original and new word.

Now that both an LEB and an REB have been established, all the characters of the new word between the two boundaries will have to be eventually printed and in order to do that the typewriter 10 will have to have those characters identified for the printing operations. In order to identify those characters for printing, all the characters between the two boundaries in the new word are loaded into the holding buffer 45. The flow from operations 152, 154 and 156 are all directed to operation 128 shown in FIG. 4, which has heretofore been described.

Figure 6:
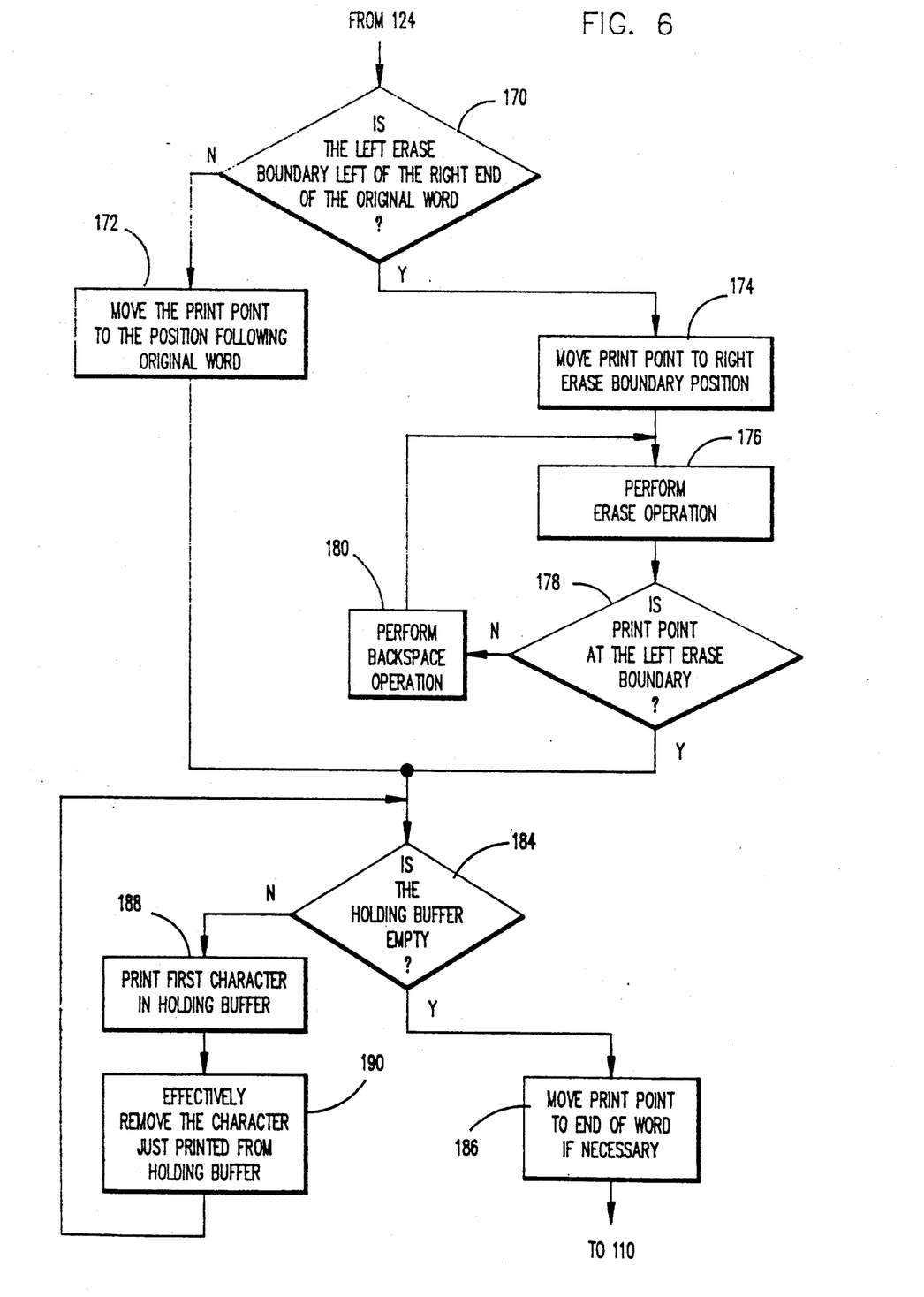

As related earlier, operation 128 in FIG. 4 may be expanded for easier understanding, by reference to FIG. 6. In FIG. 6, the flow enters from operation 128 and exits to Operation 110 of FIG. 4. The initial action is operation 170, in which the LEB position is compared with the position of the right end of the original word to see if the LEB is left of or on the word ending position. This test determines if there are characters to be erased in the original word. If the determination is in the negative then the flow is to operation 172, where the print point is moved using conventional escapement commands, internally generated, to the print position immediately following the original word.

If the determination made in operation 170 is that the LEB is to the left of the right end of the original word then there is at least one character that must be erased and the print point must be moved to the REB in preparation for the erasure of the characters bounded by the LEB and REB. This movement is commanded by operation 174.

Thereafter, the flow is to operation 176 where an erase operation is performed, to remove the character at that position.

After the erase operation of operation 176, the flow is to operation 178. At operation 178, a comparison is made between the next left print point position, shown as X POS in buffer 48, and the LEB. If the comparison results in the determination that the print point is not at the LEB there is at least one more character which must be erased. Therefore, a backspace operation is performed in operation 180 and then the flow is looped back to operation 176 where an additional erase operation is performed.

If on the other hand, the next print point is located at the LEB, then the character or characters at or to the right of the LEB have been erased. Under this circumstance, the flow from operation 178, along the affirmative path is to operation 184.

As described above, the flows from both operations 172 and 178 are directed to operation 184 where the holding buffer 45 is tested to determine if the buffer 45 is empty. If the buffer 45 is empty, there are no characters to print in the course of the correction operations and the print point is moved to the second space following the original word either as typed or as modified, if necessary. Of course, if the print point is already in that position, as is the case if the flow is through operation 172, then no movement of the print point is necessary.

Should, on the other hand, there be character codes loaded in and resident in the holding buffer 45, then the determination in operation 184 is in the negative, and the flow branches to operation 188, where the commands necessary to cause the first character in the buffer to be printed, are generated.

After a character in the buffer 45 has been printed, then the character just printed is effectively removed from the holding buffer 45. This may be accomplished in a number of ways such as moving a pointer for the entry point to the buffer 45, or by actually erasing the character from the buffer 45. An arrangement where the contents of the buffer 45 may be shifted and the code shifted out of the buffer 45 is also an approach.

After the holding buffer 45 is updated by effectively removing the character code, the action loops back to the point of initiation of operation 184, where the loop of operations 184, 188 and 190 continues until the buffer is empty upon test in operation 184. At this point, the flow will be to operation 186, as described earlier.

After the print point is positioned as in operation 186, the flow is to operation 110 where the control of the typewriter is returned to the typewriter control segment 32.

From the foregoing description of the typewriter 10 and the flow of the control logic, it is clear the typewriter 10 first detects if the word is misspelled and then proceeds to correct it. In correcting the misspelling, the zone which contains the erroneous letters is determined and may include some correct letters intermixed with the erroneous letters. Once the erroneous letter zone is delimited, the typewriter positions the print point such that the erroneous letters will be erased from the right to the left, leaving those letters of the original word which are correct and outside the delimited zone. The electronic controls then selects the characters of the new or replacement word that are needed, in addition to any characters remaining of the original word, to form the new word and prints the letters in the correct position to complete the new word.

This zone of erroneous letters is defined and bounded and only the bounded zone of letters is erased and replaced resulting, not only, in a substantial savings in expense to the operator thru conservation of supplies such as ribbon and correction tape, but also in the lost time and efficiency of the operator. The operator need only wait through the erasure and replacement of a few letters and not have to have typewriter remove and replace the entire word unless necessary. With shorter interruptions, the operator can regain typing rhythm and resume efficient use of the typewriter more quickly.

The embodiment of the invention described and disclosed herein is the best mode for implementation of the invention. However, it should be understood that the invention may be implemented by using any other similar microprocessor and that the selected microprocessor may dictate the details of the implementation. It is an alternative to compare characters in the bounded zone and to space over those which are the same in both the original and the corrected word.

What is claimed is:

1. A typewriter having a keyboard for generating character and control signals; print means comprising marking means and a platen for support of a record sheet cooperating to place marks on said sheet; memory for storing a collection of preselected correctly spelled words in electronic code form; electronic control means for controlling said print means in response to signals from said keyboard, said print means further comprising means for erasing characters under the control of said electronic control means;

said electronic control means comprising means for verifying spelling of words as said words are entered through said keyboard, and means for selecting candidate words from said stored correctly spelled words which most closely correspond with a misspelled word, and means for selecting one of said candidate words and for initiating operations of said electronic control means to change said misspelled word to said selected one of said candidate words;

said electronic control means further comprising means responsive to said means for selecting and initiating for comparing said misspelled word and said selected candidate word and for delimiting the left and right end of a sequence of characters having an erroneous character at the beginning and the end of said sequence which may or may not include one or more correct characters, and for controlling said print means to remove the characters in said sequence in said misspelled word which has erroneous characters at the beginning and the end of said sequence, regardless of whether or not said sequence contains one or more correct characters, and for replacing any said removed character with a character from said selected word to form said word, and for preserving any correct characters prior to or after said sequence of characters to form said selected word.

2. The typewriter of claim 1 wherein said means for selecting and initiating further comprises means responsive to said means for comparing for establishing at least a left limit of erroneous characters within said misspelled word, thereby defining one end of the sequence which has erroneous characters.

3. The typewriter of claim 2 wherein said means for selecting and initiating further comprises means responsive to said means for comparing for establishing a right limit of erroneous characters within said misspelled word, thereby defining both ends of the sequence which has erroneous characters.

4. A typewriter having a keyboard for generating character and control signals; print means comprising marking means for placing marks representing characters on a record sheet; memory for storing a plurality of preselected correctly spelled words; electronic controls for controlling said print means in response to signals from said keyboard; said print means further comprising means for erasing characters under the control of said electronic control means;

said electronic control means comprising means for comparing words entered through said keyboard with said words stored in said memory to determine incorrect words entered through said keyboard;

means for selecting one of said preselected correctly spelled words as the desired correctly spelled word;

said electronic control means, responsive to said keyboard and said memory and said selected desired word and comprising means to determine the leftmost incorrect character and identifying said leftmost incorrect character position and a rightmost incorrect character and identifying said rightmost incorrect character position of a word having at least two characters that are incorrect;

means for controlling said means for erasing to erase all characters between and including the location of the leftmost incorrect character and the location of the rightmost incorrect character, regardless of whether or not all these characters are incorrect; and mans for controlling said printing means, responsive to said electronic controls, to print at least a character from said desired correctly spelled word in place of at least some of said erased characters to form said desired correctly spelled word.

5. A typewriter having a keyboard for generating character and control signals; print means comprising marking means for placing marks representing characters on a record sheet; memory for storing a plurality of preselected correctly spelled words, electronic controls for controlling said print means in response to signals from said keyboard;

said electronic control means, responsive to said keyboard and said memory and comprising means to determine when there is no character of a sequence of characters forming an incorrectly spelled word that is to be corrected;

means for determining candidate words having a beginning identical to said sequence of characters;

means for selecting one of said candidates;

means for controlling said printing means, responsive to said electronic controls and said means for selecting, to print at least a character to the right of a final correct character of aid sequence of characters to form correctly spelled word.

6. A typewriter having a keyboard for generating character and control signals; print means comprising marking means and a platen for support of a record sheet cooperating to place marks on said sheet; memory for storing a collection of preselected correctly spelled words in electronic code form; electronic control means for controlling said print means in response to signals from said keyboard, said print means further comprising means for erasing characters under the control of said electronic control means;

said electronic control means comprising means for verifying spelling of words as said words are entered through said keyboard, and means for selecting candidate words from said stored correctly spelled words which most closely correspond with a misspelled word, and means for selecting one of said candidate words and for initiating operations of said electronic control means to change said misspelled word to said selected one of said candidate words;

said electronic control means further comprising means responsive to said means for selecting and initiating for comparing said misspelled word and said selected candidate word and for delimiting the left and right end of a sequence of characters having an leftmost erroneous character in said word at the beginning and a rightmost erroneous character in said word at the end of said sequence, which sequence may or may not include one or more correct characters, and responsive to said delimiting for controlling said print means to remove all the characters in said sequence in said misspelled word which has erroneous characters at the beginning and the end of said sequence, regardless of whether or not said sequence contains one or more correct characters, and for replacing any said removed character with a character from said selected word after all characters within said sequence are removed, to form said word, and for preserving any correct characters prior to or after said sequence of characters to form said selected word.

* * * * *

UNITED STATES PATENT AND TRADEMARK OFFICE
CERTIFICATE OF CORRECTION

PATENT NO. : 5,013,167
DATED : May 7, 1991
INVENTOR(S) : Julie M. Ervin et al It is certified that error appears in the above-identified patent and that said Letters Patent is hereby corrected as shown below:

Title page, in the Abstract:

Line 10   Delete "character" and insert --characters--.

Column 5, Line 27   After "43" insert --in FIG. 3--;
Column 6, Line 37   Delete "22" and insert --122--.

Claim 4, Column 10, Line 64   Delete "mans" and insert --means--;
Claim 5, Column 11, Line 19   Delete "aid" and insert --said--,
Claim 5, Column 11, Line 20   After "form" insert --a--;
Claim 6, Column 12, Line 14   Delete "an" and insert --a--.

Signed and Sealed this

Eighth Day of December, 1992

*Attest:*

DOUGLAS B. COMER

*Attesting Officer*     Acting Commissioner of Patents and Trademarks